Dec. 15, 1959  H. D. EVANS  2,917,131
CYCLONE SEPARATOR
Filed April 11, 1955  2 Sheets-Sheet 1

INVENTOR
HARRY D. EVANS
BY *Oswald H. Milmore*
HIS ATTORNEY

Dec. 15, 1959  H. D. EVANS  2,917,131
CYCLONE SEPARATOR

Filed April 11, 1955  2 Sheets-Sheet 2

INVENTOR
HARRY D. EVANS
BY *Oswald H. Milmore*
HIS ATTORNEY

United States Patent Office 2,917,131
Patented Dec. 15, 1959

2,917,131

CYCLONE SEPARATOR

Harry D. Evans, Oakland, Calif., assignor to Shell Development Company, New York, N.Y., a corporation of Delaware Application April 11, 1955, Serial No. 500,602

3 Claims. (Cl. 183—85)

The invention relates to cyclone separators, herein called cyclones, for the centrifugal separation of suspended particles from a fluid containing the same. The term "particles" is used generically herein to include liquid drops and solid particles; thus, while the invention will be described primarily with reference to the separation of liquid drops from a gas, such as air or vapors in equilibrium with the liquid, it may also be applied in a dust separator, e.g., one used to remove pulverulent catalyst from hydrocarbon gas or combustion products.

Cyclones of the type considered herein include an enclosed centrifugation chamber that is shaped as a surface of revolution and to which the suspension to be separated is charged tangentially to cause circumferential or vortical motion of the suspension, thereby concentrating the suspended, relatively denser particles near the chamber wall and leaving near the axis of rotation a core of the relatively less dense fluid essentially freed from said particles; such cyclones are provided with a central fluid exit tube extending out through one end wall of the chamber for the discharge of the fluid from said core, and with a suitable outlet for the separated particles, which outlet may be located in the other end closure, particularly when the chamber is upright and the latter closure is at the bottom, but which also may be located in the side wall, particularly when the chamber is disposed horizontally.

The effectiveness of such cyclones is severely limited by the entrainment of particles in the fluid stream that emerges through the fluid exit tube, caused largely by pickup of particles that have already been concentrated near the chamber wall and/or in the end closure remote from the inlet. For example, in an upright cyclone having a downwardly convergent bottom closure (e.g., frusto-conical or hemispherical) used to separate liquid from gas a considerable quantity of separated and coalesced liquid is deposited on the side wall of the chamber and on the wall of the bottom closure. Liquid deposited on the side wall near the inlet is carried circumferentially around the wall and flows into the inlet opening, where it is re-entrained by the entering stream, whereby the liquid content of the gas at this level is increased beyond that of the entering stream and the effectiveness of the separation is impaired; liquid held up on the side wall at lower levels and on the bottom closure is similarly re-entrained by the gas vortex, pickup from the bottom closure being particularly severe as the gas reverses direction and moves toward the fluid exit tube. Both phenomena result in increased entrainment of liquid in the emerging gas stream. The retention of any considerable quantity of liquid in the cyclone, called holdup, is also undesirable in many cases, as when undesired chemical reactions are possible, e.g., in treating hydrocarbon oils at elevated temperatures wherein cracking and deposition of carbonaceous matter and/or the formation of gas are apt to occur; the latter makes it difficult to maintain a low pressure in the cyclone.

Due to the high centrifugal forces prevailing within the central exit tube a large portion of the entrained liquid is deposited on the inner surface of the tube. However, the flow patterns of the gas are often such that much of this deposited liquid is carried upwards by the effluent gas either as a film or by further re-entrainment. Liquid is also deposited on the inside of the exit tube by splashing or wall creep from the outside of the tube. At low superficial gas velocities through the tube such liquid on the inside of the tube, however deposited, can drain down, but at or above a critical superficial velocity this liquid is carried up. (The superficial velocity is the quotient of the volumetric gas flow rate by the cross sectional area of the exit tube.) It was found that the critical superficial gas velocity is significantly affected by the gas flow patterns.

Moreover, the pressure drop of the fluid through the cyclone is greatly affected by the flow patterns of the gas and probably also by the re-entrainment of separated particles, as described above.

It is a general object of the invention to improve the effectiveness of cyclones by reducing the entrainment of separated particles in the effluent by means of baffles disposed to reduce entrainment.

Related objects are to alter the fluid flow patterns in the cyclone in a manner to reduce the pressure drop; to reduce the liquid holdup in the cyclone; and to promote flow patterns that effect an increase in the critical superficial gas velocity in the exit tube so that the tendency of the gas to carry up liquid which is deposited on the inner side of the exit tube is reduced.

In summary, according to the invention the cyclone is provided with closure vortex-breaker baffles constructed as described herein.

The closure vortex-breaker baffles are blades fixed within an end closure that is united to the end of a substantially tubiform centrifugation chamber wall which is remote from the inlet and converges toward the chamber axis in the direction away from the chamber to an underflow outlet opening; the blades extend from the close vicinity of the closure wall (either sealed thereto or with a slight clearance) inwardly generally toward said axis at least as far as a coaxial cylindrical surface extending from the margin of said outlet opening. The inner edges of the blades may but need not be joined at the axis or disposed tangentially to the said cylindrical surface. When the blades are not radial they are advantageously inclined in the downstream direction with respect to the local radial planes so as to deflect the fluid toward the center, it having been found that inclination of the blades in the upstream direction forms undesirable body currents. An important feature of the blades according to the invention is that they extend for substantially the full axial extent of the closure; they preferably have edges directed toward the centrifugation chamber that slope from the said juncture toward the chamber axis in the direction toward the underflow outlet opening. Optimum results are attained when the blades extend fully to the underflow opening and are there in abutting, co-planar relation to longitudinal vanes fitted in the drawoff pipe which is connected to said opening.

Under certain conditions, particularly at high fluid flow velocities, entrainment is further reduced by mounting a central baffle transverse to the axis between the end of the fluid exit tube and the vortex-breaker baffle blades.

An inlet baffle may be mounted within the centrifugation chamber in the annular space between the side wall and the exit tube and extends into the said space from the side wall at the side of the inlet opening that is upstream with respect to the circumferential direction of fluid flow. This baffle is preferably sealed to the chamber wall, inclined in the upstream direction, and for best results extends longitudinally from the end closure that is nearest the inlet opening to just beyond the inlet opening. Also, it was found that this baffle is most effective when it extends into the said annular space for approximately half of the radial clearance between the side wall and the exit tube.

Having thus described the general purpose and nature of the invention, a more detailed description will be made with reference to the accompanying drawings forming a part of this specification and showing certain preferred embodiments, wherein:

Figure 1 is a vertical sectional view of an upright cyclone constructed in accordance with the invention;

Figures 2 and 3 are horizontal sectional views taken on the lines 2—2 and 3—3, respectively, of Figure 1;

Figure 1:
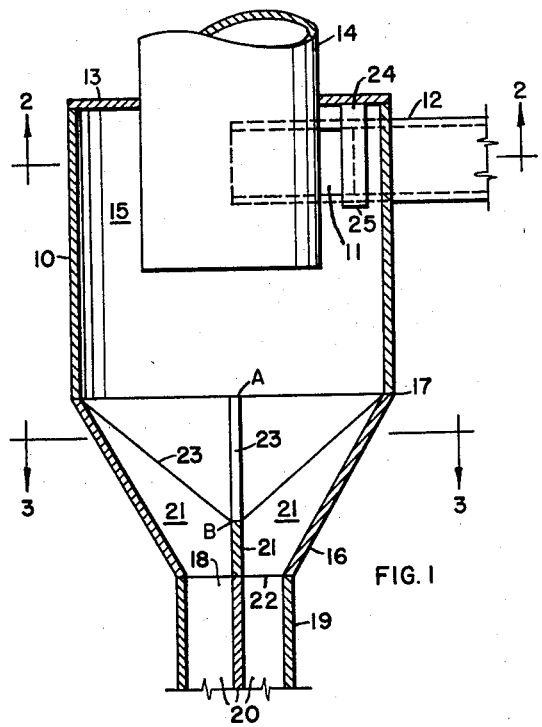
Figure 2:
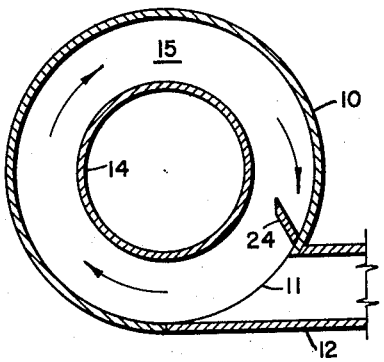
Figure 3:
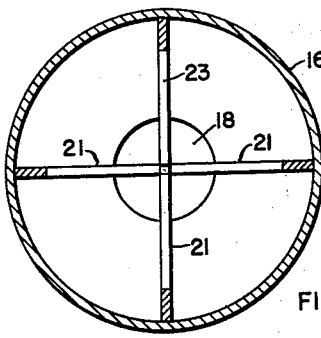

Referring to Figures 1–3, the cyclone includes a cylindrical side wall 10 defining a centrifugation chamber and having near the top thereof an inlet opening 11 to which is connected a rectangular inlet duct 12 disposed to admit the suspension tangentially to the wall 10. The top of the chamber is closed by a top closure 13 through which extends a central fluid exit tube 14 having a diameter less than the side wall so as to provide an annular clearance space 15. The exit tube may extend to a level somewhat below the bottom of the inlet opening 11, as shown and has an open lower end situated within the side wall 10. A bottom closure 16 is joined to the bottom of the side wall at a peripheral juncture line 17, sometimes known in the art as the tangent line, and converges downwards from said line toward the central axis. It should be understood that while a conical bottom closure was illustrated the invention is not limited thereto. An underflow outlet opening 18 is formed at the lowest part of the bottom closure and communicates with a drawoff pipe 19 that advantageously contains vertical vanes 20 arranged, for example, as a cross, for arresting the spinning motion of the effluent.

The vortex-breaker baffles according to the invention are constituted by a plurality, e.g., four, generally upright, e.g., vertical, blades 21 that have their outer edges conformed generally to the contour of the closure wall and positioned in the close vicinity of said wall; they extend from the top of the closure, at the juncture line 17, downwards substantially to the bottom thereof at the opening 18. In the preferred construction these blades extend fully to the bottom of the closure, as shown, and have their bottom edges 22 in abutting relation to the top edges of the vanes 20, at least the bottom portions of the blades being coplanar with the vanes so as to form upward extensions thereof; this arrangement achieves greatest reduction of eddy currents. Acceptable, although not optimum, results can be achieved without complying with the requirements of the preceding sentence. It is not essential that the outer edges of the blades be sealed to the closure wall and slight clearances are not detrimental; large clearances, about one-fourth inch, were however found to decrease the effectiveness of these blades. The blades extend from the closure wall generally toward the axis, e.g., radially as shown in this embodiment, to upwardly and inwardly directed, inclined edges 23. These edges slope from the vicinity of the juncture line 17 to a point B situated on the axis some distance beneath point A, which is the intersection of the axis with the transverse plane of the juncture line 17. For best results the distance AB is at least one-fourth of the height of the bottom closure and may equal said height. It is, however, desirable that the point B be situated not lower than the bottom of the closure; stated in other words, the lower portions of the several blades extend far enough from the closure wall to meet within the closure.

The inlet baffle of the invention is constituted by a baffle plate 24 that is joined to the side wall 10 along a line parallel to the chamber axis and situated close to the inlet opening 11 at the upstream side thereof with respect to the circumferential direction of fluid motion as shown by the arrows in Figure 2. The plate is advantageously inclined in the upstream direction with respect to the local radial axial plane, as shown, to form a pocket and for best results extends into the clearance space 15 through a distance equal to about half the radial dimension of said space, although other distances, e.g., from 0.2 to 0.6 of said radial dimension, may be used. The plate advantageously has one extremity thereof adjacent to the end closure 13, even when, as in the case illustrated, the inlet opening 11 is spaced somewhat from this closure; it extends longitudinally from the said closure to an edge 25 that is situated close to the transverse plane at the end of the opening 11 remote from the closure.

An employed, for example, for separating liquid from a gas in which it is dispersed as small droplets, the suspension is charged into the chamber through the inlet duct 12 and forms a vortex moving in the direction of the arrows. The suspended liquid is flung against the chamber wall by centrifugal force and there coalesces to form a thick film that is carried about the wall be the gas and descends with a helix-like motion into the closure, wherein the circumferential motion of the liquid is arrested by the blades 21 and from which the liquid flows through the outlet opening 18 into the drawoff pipe 19. The gas initially flows circumferentially through the annular space 15; beneath the tube 14 it changes direction and flows upwards through the latter.

The inlet baffle plate 24 prevents the liquid moving around the chamber wall from reaching the opening 11 and thereby being picked up by the entering gas stream. Instead, this liquid is collected in the pocket within the acute angle between the baffle plate and the side wall and drains downward. By suitably locating the lower edge 25 of this baffle close to the level of the bottom of the opening 11 it presents a minimum obstruction to the helical flow of gas.

The closure vortex-breaker blades 21, due to their height and their great radial extent at the bottom, are more effective than earlier vortex breakers in arresting the circumferential motion of the separated liquid along the wall of the bottom closure. One consequence is that the liquid flows off more rapidly, thereby reducing holdup. Also, the pockets formed by the blades are deep, both vertically and radially, and this together with the reduced holdup significantly reduces the re-entrainment of liquid from the closure wall by the spinning gas as it reverses direction prior to entering the exit tube 14. The shape of the blades 21, with their inclined edges 23, was also found to increase the critical superficial gas velocity in the exit tube 14, whereby the tendency of the gas to carry up liquid along the inner wall of the tube is sharply reduced.

Each of the two baffles described, namely, the inlet baffle 24 and the blades 21, contributes to more effective separation, reduced entrainment of liquid in the exit gas, reduced holdup, and reduced pressure drop.

Figure 4:
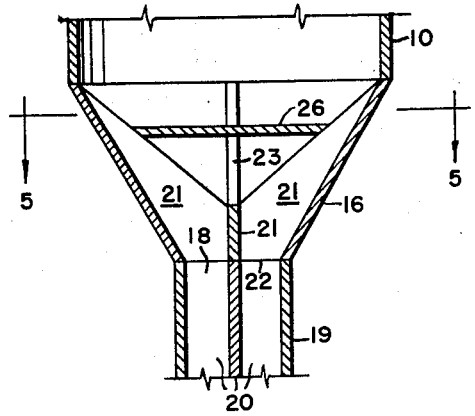
Figure 4 is a vertical sectional view of the bottom of the cyclone of Figure 1 showing a modification.
Figure 5:
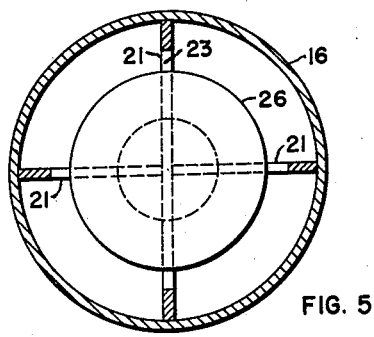
Figure 5 is a horizontal sectional view taken on the line 5—5 of Figure 4.

Figures 4 and 5 show a modification wherein a circular baffle plate or disc 26 is mounted at and transversely to the axis between the end of the exit tube 14 and the blades 21. In the specific arrangement shown the plate 26 is imperforate and situated within the bottom closure, resting on the blades 21; these features are not, however, in every case essential. This disc is effective particularly at high flow velocities for reducing entrainment of particles in the fluid discharged through the tube 14.

Figure 6:
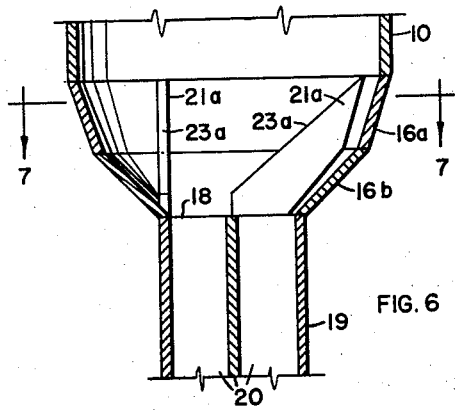
Figure 6 is a vertical sectional view of the lower part of an upright cyclone showing a modified arrangement of the closure vortex-breaker baffles.
Figure 7:
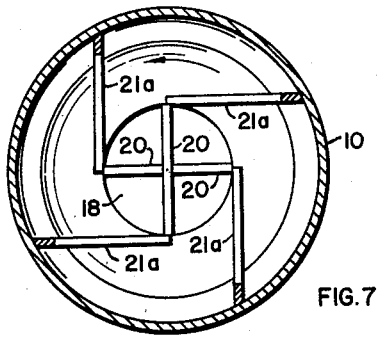
Figure 7 is a horizontal sectional view taken on the line 7—7 of Figure 6.

Referring to Figures 6 and 7, the cyclone side wall 10 is joined at the juncture line 17 to a bottom closure that is, in this instance, shown as composed of two frusto-conical sections 16a and 16b of increasing cone angle, and having a bottom outlet opening 18 that communicates with the drawoff pipe 19 containing the vanes 20. The vortex-breaker blades 21a in this embodiment also extend from the juncture line 17 to the opening 18, are vertical, and extend from the closure wall generally toward the axis to sloping edges 23a; the blades are, however, inclined with respect to the local radial planes in the downstream direction with regard to the flow direction indicated by the arrows in Figure 7. More specifically, they are shown to be tangent to a cylindrical surface that is coaxial with the chamber axis and passes through the margin of the opening 18. By inclining the blades downstream, instead of upstream as in some prior art arrangements, they tend to deflect the vortically moving gas toward the axis of rotation, thereby aiding the reversal in flow direction of the gases and reducing entrainment of liquid and pressure drop.

Figure 8:
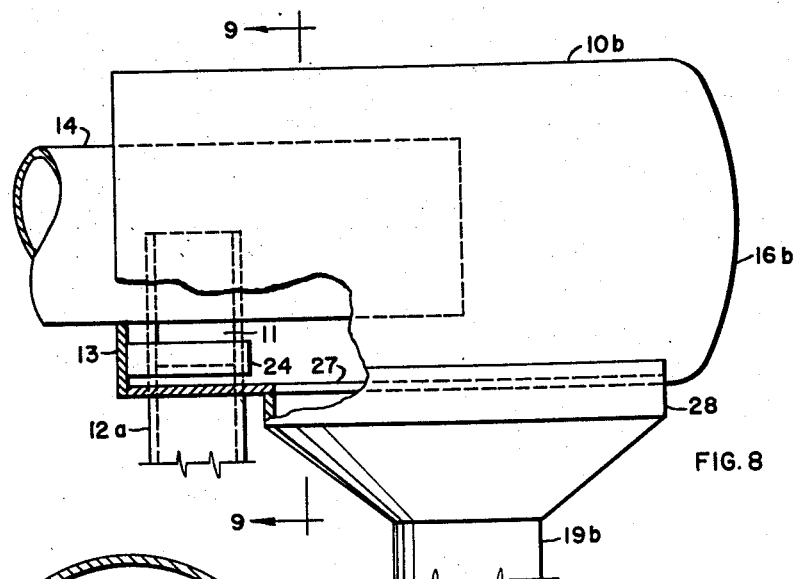
Figure 8 is an elevation view of a horizontal cyclone constructed in accordance with the invention, parts being shown in section.
Figure 9:
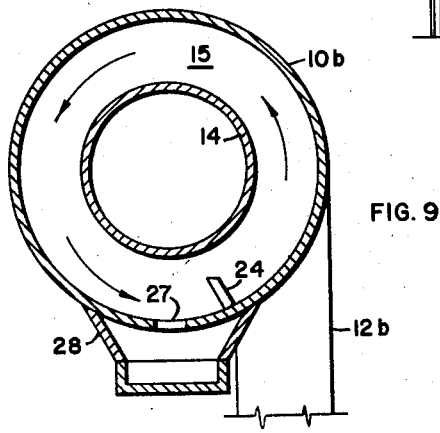
Figure 9 is a transverse sectional view taken on the line 9—9 of Figure 8.

Figures 8 and 9 show the application of the inlet baffle to a horizontal cyclone; parts corresponding to those of Figure 1 have like reference numbers. The cyclone comprises a cylindrical side wall 10b having a horizontal axis and a vertical, rectangular inlet duct 12b is connected tangentially thereto through an inlet opening 11 near one end closure 13, through which extends the exit tube 14. A second end closure 16b which may, for example, be partly spheroidal in shape, is joined to the other end of the side wall. The side wall has a slot 27 along the bottom thereof forming an outlet opening for the separated particles and extending coextensively with a hopper 28 which is fixed to the lower side of the wall 10b and is connected to a drawoff pipe 19b.

The inlet baffle 24 is fixed to the side wall 10b along a line generally parallel to the chamber axis at the upstream side of the inlet opening 11 and extends into the clearance space 15 at an upstream inclination; it extends longitudinally from the end closure 13 just beyond the remote edge of the opening 11.

The function of the baffle 24 is the same as that described for Figures 1–3, in that its prevents separated liquid or solid particles near the wall 11b from being swept circumferentially into the entering gas stream. Instead, separated matter moves in the direction away from the closure 13 and enters the slot 27, together with particles deposited on other portions of the wall 10b, into the hopper 28 for discharge through the pipe 19; the gas, which moves with a vortical motion away from the closure 13, reverses direction beyond the open end of the tube 14 and is discharged through the latter.

EXAMPLE I

A cyclone, constructed as shown in Figures 1–3, having an enclosed centrifugation chamber with an internal diameter of 10 inches and a length of 10 inches, a bottom closure 5.2 inches in height, and an exit tube with an internal diameter of 6 inches and a draw-off pipe 19 with an internal diameter of 4 inches was tested by supplying to it a suspension consisting of 64 weight percent air and 36 weight percent water. For purposes of comparison various baffle arrangements were tested:

*Arrangement 1.*—The cyclone as shown, including the vanes 20 in the pipe 19, but without either the baffles 21 or 24.

*Arrangement 2.*—The cyclone as in arrangement 1 but having four vertical baffles extending fully across the bottom closure in the form of a cross, the baffles having horizontal top edges situated at about the mid-height of the bottom closure.

*Arrangements 3a–3d.*—The cyclone as in arrangement 1 but provided with baffles 21 as shown in the drawings. Four different models were tested wherein different heights for the point B were used; these heights, defined by the ratio of the vertical distance AB to the total height of the bottom closure, were 0, 0.38, 0.62 and 1.0, for arrangements 3a, 3b, 3c and 3d, respectively.

*Arrangement 4.*—The cyclone as in arrangement 1 but having an inlet baffle 24 as shown in Figures 1 and 2.

*Arrangement 5.*—The cyclone as in arrangement 3d but having an inlet baffle 24 as shown in Figures 1 and 2.

The entrainment of water in the gas discharged through the exit tube 14 was determined for each run. The runs were repeated at different gas inlet velocities. Results are shown in Table I:

*Table I*

| Cyclone Inlet Vel., ft/sec. | Entrainment—Weight Percent Water in Effluent Air | | | | | | | |
|---|---|---|---|---|---|---|---|---|
| | 1 | 2 | 3a | 3b | 3c | 3d | 4 | 5 |
| 175 | 1.8 | 1.8 | 0.79 | 0.17 | 0.03 | 0.12 | 0.75 | 0.07 |
| 200 | 6.7 | 18 | 0.78 | 0.23 | 0.11 | 0.45 | 2.0 | 0.12 |
| 225 | 15 | 37 | 0.87 | 0.59 | 0.67 | 2.0 | 13.7 | 1.05 |
| 250 | 29 | 30 | 1.9 | 2.1 | 5.5 | 2.8 | 14.0 | 1.08 |

A comparison of columns 1 and 2 shows the ineffectiveness of baffles that extend only partly to the top of the bottom closure. Marked improvements are attained by the baffles according to the invention, used in arrangements 3a–3d. Here it may be noted that while the baffles used in arrangement 3a, wherein the point B coincided with point A of Figure 1, gave good results at high inlet velocities, they were relatively less effective than those used in the preferred arrangements 3b–3d at the lower velocities, which are closer to those encountered in most industrial applications. Column 4, when compared with column 1, indicates an improvement due to the use of the inlet baffle alone; when compared with column 3d, it indicates an added improvement when used in conjunction with the closure vortex-breaker baffles.

EXAMPLE II

The holdup corresponding to arrangements 1, 3d and 4 was measured by operating the cyclone in the manner described for Example I, but using a stream consisting of 65 weight percent air and 35 weight percent water, suddenly stopping the inflow of the air suspension, and collecting the liquid within the cyclone. Results are shown in Table II:

*Table II*

| Cyclone Inlet Velocity, ft./sec. | Liquid Holdup—Lbs. of Water | | |
|---|---|---|---|
| | 1 | 3d | 4 |
| 163 | 9.3 | 0.2 | 2.8 |
| 175 | 10.2 | 0.25 | 3.0 |
| 200 | 11.7 | 0.35 | 3.6 |
| 225 | 12.5 | 0.45 | 5.0 |
| 250 | 13.2 | 0.55 | 8.5 |

EXAMPLE III

The pressure drop in arrangements 1, 3d, 4 and 5 was determined under the conditions of Example I with inlet velocities between 150 and 250 ft. per sec. The pressure drops measured for the last three of these were computed as percentages of that measured in arrangement 1 and found to be as follows:

| Arrangement: | Percent |
|---|---|
| 1 | 100 |
| 3d | 100 |
| 4 | 70 |
| 5 | 55 |

EXAMPLE IV

The critical superficial gas velocity in the central exit tube was determined for arrangements 1, 3c and 3d of Example I to be as follows:

| Arrangement: | Ft. per sec. |
|---|---|
| 1 | 19 |
| 3c | 39 |
| 3d | 33 |

These data show the gas flow patterns to be favorably altered by the closure vortex-breaker baffles according to the invention so as to reduce the tendency of the effluent gas to carry liquid up along the inside of the exit tube.

I claim as my invention:

1. A cyclone for separating suspended particles from a fluid comprising: an enclosed centrifugation chamber including a substantially tubular side wall having an upright axis, said side wall having an inlet opening at an upper part thereof, a top closure joined to the top of said side wall, and a bottom closure joined to the bottom of said side wall and converging downwards therefrom progressively toward said axis to an open underflow outlet, the inner surface of said tubular side wall being a continuous surface of revolution for the major part of the height thereof below said inlet opening; means for supplying said fluid, burdened with said suspended particles, substantially tangentially to said side wall through said inlet opening; a drawoff pipe connected to said underflow outlet; a fluid exit tube of smaller diameter than said side wall extending through said top closure centrally with respect to the centrifugation chamber and having an open intake end situated above the bottom of said tubular side wall; and a plurality of vortex-breaker blades fixed within said bottom closure extending radially inwards from the close vicinity of the closure wall at least as far as the axial projection of said underflow outlet, the lower parts of said blades being near the level of said underflow outlet, said blades being joined at the said axis above the bottom of said closure and having upper edges that slope downwards from the top of the bottom closure to a level below the bottom of the side wall by a distance at least one-fourth of the height of the bottom closure.

2. In combination with a cyclone according to claim 1, a substantially horizontal baffle having a diameter materially less than that of said tubular side wall mounted at the said axis below the uppermost parts of the said vortex-breaker blades and above the bottom of said bottom closure in radially spaced relation thereto.

3. A cyclone for separating suspended particles from a fluid comprising: an enclosed centrifugation chamber including a substantially tubular side wall having an upright axis, said side wall having an inlet opening at an upper part thereof, a top closure joined to the top of said side wall, and a bottom closure joined to the bottom of said side wall and covergoing downwards therefrom progressively toward said axis to an open underflow outlet, the inner surface of said tubular side wall being a continuous surface of revolution for the major part of the height thereof below said inlet opening; means for supplying said fluid, burdened with said suspended particles, substantially tangentially to said side wall through said inlet opening; a drawoff pipe connected to said underflow outlet; a fluid exit tube of smaller diameter than said side wall extending through said top closure centrally with respect to the centrifugation chamber and having an open intake end situated above the bottom of said tubular side wall; a plurality of vortex-breaker blades fixed within said bottom closure extending inwards from the close vicinity of the closure wall at least as far as the axial projection of said underflow outlet, the lower parts of said blades being near the level of said underflow outlet and said blades having upper edges that slope downwards and inwards from the top of the bottom closure; and longitudinal vanes within said drawoff pipe joined at the upper edges thereof in coplanar relation to the bottom edges of said vortex-breaker blades.

References Cited in the file of this patent

UNITED STATES PATENTS

| 479,267 | Van Gelder | July 19, 1892 |
| 522,769 | Thompson et al. | July 10, 1894 |
| 1,607,744 | Mabie | Nov. 23, 1926 |
| 2,191,671 | Kuhner | Feb. 27, 1940 |
| 2,214,658 | Browning | Sept. 10, 1940 |
| 2,385,745 | Vogt | Sept. 25, 1945 |
| 2,616,563 | Hebb | Nov. 4, 1952 |

FOREIGN PATENTS

| 823,169 | France | Oct. 11, 1937 |
| 11,600 | Great Britain | July 20, 1889 |
| 38,903 | Netherlands | Aug. 15, 1936 |
| 489,806 | Canada | Jan. 20, 1953 |